United States Patent [19]
Kodama et al.

[11] Patent Number: 5,385,462
[45] Date of Patent: Jan. 31, 1995

[54] VENT-TYPE INJECTION MOLDING MACHINE

[75] Inventors: Takashi Kodama; Kiyoto Takizawa, both of Nagano, Japan

[73] Assignee: Nissei Plastic Industrial Co., Ltd., Nagano, Japan

[21] Appl. No.: 119,391

[22] Filed: Sep. 13, 1993

[51] Int. Cl.⁶ .................................................. B29C 45/63
[52] U.S. Cl. ................................ 425/135; 366/75; 425/203; 425/812; 425/815
[58] Field of Search ............... 425/135, 169, 203, 546, 425/812, 815; 366/75

[56] References Cited

U.S. PATENT DOCUMENTS

| | | | |
|---|---|---|---|
| 3,879,155 | 4/1975 | Hendry | 425/203 |
| 4,060,226 | 11/1977 | Schweller | 425/203 |
| 4,112,519 | 9/1978 | Kruder | 425/203 |
| 4,247,519 | 1/1981 | Sano | 425/203 |
| 4,392,804 | 7/1983 | Pushee et al. | 425/203 |
| 4,767,303 | 8/1988 | Sakakura et al. | 425/203 |
| 4,820,463 | 4/1989 | Raufast | 425/203 |
| 4,959,186 | 9/1990 | Dollhopf et al. | 425/203 |

FOREIGN PATENT DOCUMENTS

| | | | |
|---|---|---|---|
| 60-49916 | 3/1985 | Japan | 425/203 |
| 3-216321 | 9/1991 | Japan | . |
| 4-2611 | 1/1992 | Japan | . |

*Primary Examiner*—James P. Mackey

[57] ABSTRACT

A vent hole 3 for exhausting a gas component generated from a melted resin is provided at a heating cylinder. A gas staying chamber is formed at the interior by covering the upper portion of the vent hole, and there are provided a vent hole cover having a gas exhaust port at its upper portion and an inert gas supply unit for supplying an inert gas to the inside of the vent hole cover. Thereby the inert gas stays in the gas staying chamber, and a gas shielding layer for shielding the vent hole from the atmospheric air is formed.

6 Claims, 3 Drawing Sheets

VENT-TYPE INJECTION MOLDING MACHINE

FIELD OF THE INVENTION

This invention relates to a vent-type injection molding machine which is provided with a vent hole for exhausting a gas component generated from a melted resin at a heating cylinder.

DESCRIPTION OF THE RELEVANT ART

Generally, in the injection molding machine, a solid molding material is supplied to the inside of a heating cylinder from a hopper provided at a rear portion of the heating cylinder, and the supplied molding material is transferred frontward while being plasticized and melted by heating and revolution of a screw.

When solid molding materials are exposed to air for a long time, decomposition and deterioration take place. Thus, injection machines, in which an inert gas is utilized to make the solid molding material not to directly contact with air, have been also proposed in the official gazette of Japanese Patent Application Laid-open No. 3(1991)-216321 and the official gazette of Japanese Utility Model Application Laid-open No. 4(1992)-2611.

In the case of the former injection molding machine, one hole is provided in the vicinity of a hopper on a heating cylinder. An inert gas concentration measuring apparatus is provided in the hole. A gas inflow tube which is connected to a bomb for inert gas is introduced into the hopper, and the inside of the hopper is filled with the inert gas by passing it through a plurality of small holes provided at the gas inflow tube. Thereby the solid molding material is prevented from contacting with air, and it is made such that a predetermined inert gas amount is always maintained by measuring the concentration of the inert gas with the inert gas concentration measuring apparatus.

Also in the case of the latter injection molding machine, in the same manner as the former injection molding machine, by having the inert gas fill up in the inside of the hopper, the solid molding material is prevented from contacting with air.

On the other hand, a vent-type injection molding machine, in which a vent hole for exhausting gas component is provided at an intermediate portion of a heating cylinder containing a screw, is known.

In the case of the vent-type injection molding machine, the solid molding material is supplied to the inside of the heating cylinder from a hopper provided at a rear portion of the heating cylinder. The supplied molding material is transferred frontward while being plasticized and melted by heating and revolution of the screw, which is the same as the general injection molding machine. However, there is provided such a function that the gas component containing steam generated from the melted resin which is being transferred in the heating cylinder is exhausted to the outside from a vent hole.

However, such a vent-type injection molding machine has the structure that the inside of the heating cylinder communicates with the outside through the vent hole. In principle the melted resin in the heating cylinder is apt to contact with the atmospheric air, so that there have been such problems that depending on the type of polyamide resins, ABS resins or the like, the melted resin in the heating cylinder contacts with the atmospheric air during passing through the vent hole. The surface of the melted resin is oxidized or carbonized, the originally white resin is colored to pale yellow or pale brown and the like, resulting in that the molding quality is considerably lowered.

SUMMARY OF THE INVENTION

It is an object of this invention to provide a vent-type injection molding machine with which discoloration and deterioration due to oxidation or carbonization of the melted resin in the heating cylinder are certainly prevented, and it is possible to remarkably improve the molding quality.

In order to achieve this object, this invention is characterized in that, in a vent-type injection molding machine 1 which is provided with a vent hole 3 for exhausting a gas component Gr generated from a melted resin E at a heating cylinder 2, a gas staying chamber C is formed at the interior by covering the upper portion of the vent hole 3, and there are provided a vent hole cover 5 having a gas exhaust port 4 at its upper portion and an inert gas supply unit 6 for supplying an inert gas Gc to the inside of the vent hole cover 5.

In this case, the gas exhaust port 4 may be a spontaneous exhaust port 4a which directly communicates with the atmospheric air, or may be connected to a forced suction unit 9 which performs forced exhaust by the suction of a vacuum pump 8. In the case of the spontaneous exhaust port 4a, it is desirable to provide a lid 11 having a valve function freely capable of opening and closing for covering the gas exhaust port 4. In addition, when the forced suction unit 9 is connected, it is desirable to provide a recovery tank 22 having a cooling passage 23 for recovering the gas component Gr sucked through the gas exhaust port 4. Further, the inert gas supply unit 6 can be constituted by providing a supply control section 7 which supplies the inert gas Gc when the generation amount of the gas component Gr is not more than a certain amount.

Owing to such constitution, the inert gas Gc is supplied from the inert gas supply unit 6 to the inside of the vent hole cover 5. And the inert gas Gc stays in the gas staying chamber C, and a gas shielding layer for shielding the vent hole 3 from the atmospheric air is formed in the gas staying chamber C. Thus, the melted resin E in the heating cylinder 2 is shielded from the atmospheric air by the gas shielding layer, and oxidation (carbonization) of the melted resin E is prevented.

In this case, the gas component Gr generated from the melted resin E ascends by passing through the vent hole 3 and the gas staying chamber C, and is exhausted into the atmospheric air through the gas exhaust port 4 provided at the upper portion of the vent hole cover 5. Incidentally, when the exhaust gas port 4 is constituted by the spontaneous exhaust port 4a, the high temperature gas component Gr is exhausted to the outside from the spontaneous exhaust port 4a by natural convection, while when the forced suction unit 9 is connected to the gas exhaust port 4, the gas component Gr is sucked by the vacuum pump 8, and exhausted by force.

In addition, when the inert gas supply unit 6 is provided with the supply control section 7, the inert gas Gc can be supplied only when the generation amount of the gas component Gr is not more than a certain amount. Namely, when the generation amount of the gas component Gr is large, there is no fear for the melted resin E to contact with the atmospheric air, so that by stopping the supply of the inert gas Gc, the exhaust of the gas component Gr can be facilitated, and the using amount of the inert gas Gc can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The most suitable embodiments of this invention will be taken up and explained in detail on the basis of the drawings.

Figure 1:
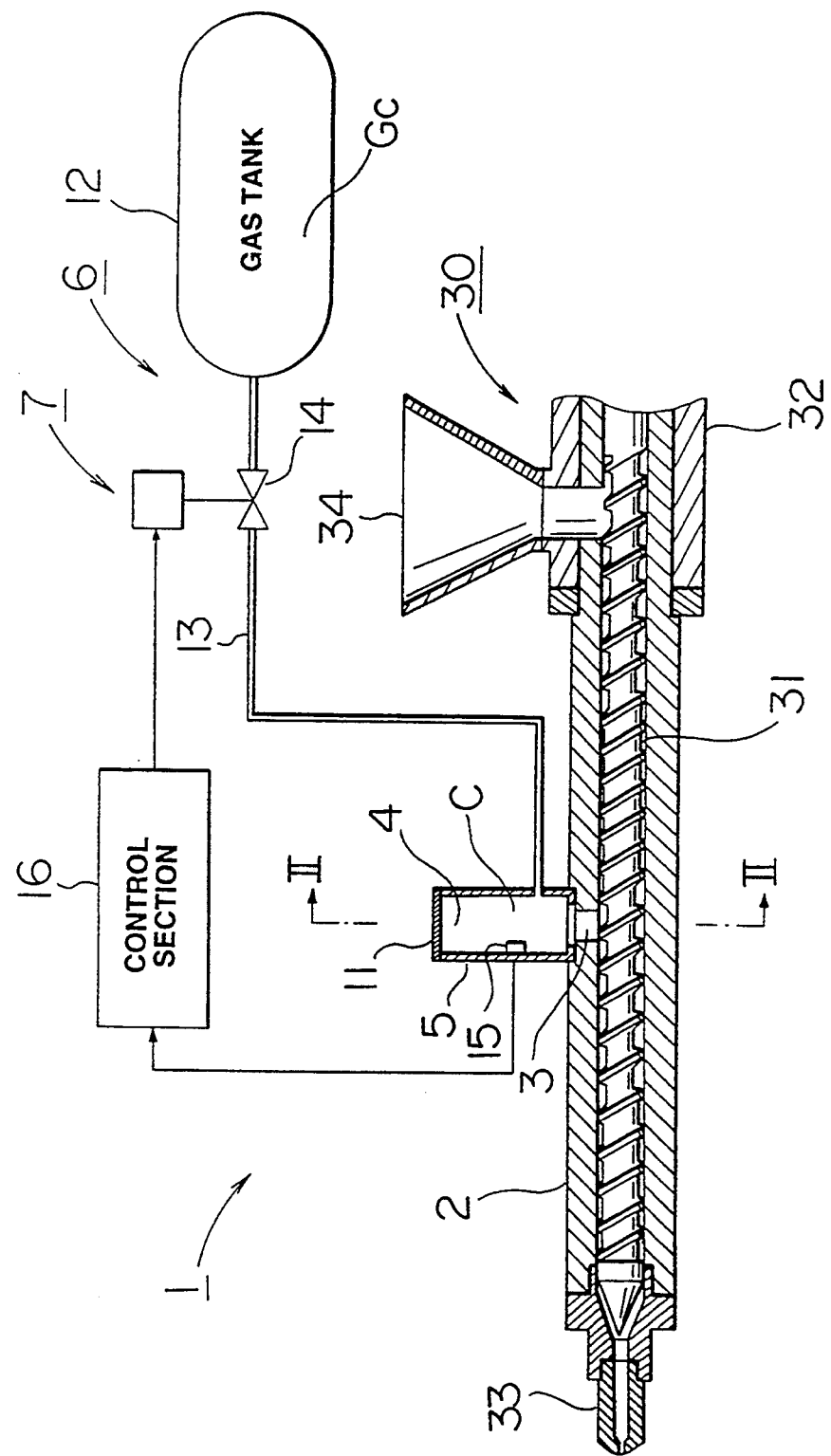
FIG. 1 is a block diagram for important parts of a vent-type injection molding machine according to this invention.

At first, the constitution of the vent-type injection molding machine 1 according to this invention will be explained with reference to FIG. 1 and FIG. 2.

An injection apparatus 30 is provided for an injection molding machine 1, which is provided with a heating cylinder 2. The heating cylinder 2 contains a screw 31, and its rear end is connected to a forward end portion of an injection cylinder 32. In addition, the heating cylinder 2 is provided with an injection nozzle 33 at its forward end, and a hopper 34 for supplying a resin material at its rear portion, respectively.

On the other hand, a vent hole 3 which opens upward is provided at an intermediate position of the heating cylinder 2, and the vent hole 3 is provided with a vent hole cover 5. The vent hole cover 5 is formed in a cylindrical shape, and its lower end is attached to the upper end of the heating cylinder 2 where the vent hole 3 is located. Thereby the upper portion of the vent hole 3 is covered with the vent hole cover 5, and the inside of the vent hole cover 5 communicates with the vent hole 3. In addition, the upper end of the vent hole cover 5 is open, at which a lid 11 having a valve function freely capable of opening and closing is provided, so as to prevent the invasion of dust or the like into the inside. Incidentally, the lid 11 may be not necessarily provided. Owing to this constitution, a gas staying chamber C is formed at the inside of the vent hole cover 5, and the upper end opening serves as a gas exhaust port 4.

On the other hand, an inert gas supply unit 6 is connected to a lower portion of the vent hole cover 5. Namely, the inert gas supply unit 6 is provided with a gas tank 12 which accommodates an inert gas Gc, the gas tank 12 is connected to the lower portion of the vent hole cover 5 through a gas pipe 13, and a variable throttle valve 14 is connected at an intermediate portion of the gas pipe 13. Incidentally, it is desirable that an inert gas which is heavier than air and relatively cheap and has less environmental influence such as $CO_2$ or the like is used as the inert gas Gc. In addition, even $N_2$ (nitrogen gas) and the like can be used by plugging the upper end opening as in an altered embodiment which will be described later and so on. On the other hand, the vent hole cover 5 is provided with a pressure sensor 15 for detecting the internal pressure of the gas staying chamber C, the pressure sensor 15 is connected to a control section 16, and the control section 16 is connected to a control input portion of the variable throttle valve 14.

Next, the functions of important parts of the vent-type injection molding machine 1 according to this invention will be explained with reference to FIG. 1 and FIG. 2.

At first, when the molding is performed, the variable throttle valve 14 is controlled to a predetermined aperture, and the inert gas Gc is supplied from the gas tank 12 to the inside of the vent hole cover 5. Thereby, the relatively heavy inert gas Gc stays in the gas staying chamber C as shown by solid line arrows in FIG. 2, and a gas shielding layer for shielding the vent hole 3 from the atmospheric air is formed at the inside of the gas staying chamber C. Thus, a melted resin E in the vent hole 3 is shielded from the atmospheric air by the gas shielding layer. Incidentally, little pressurizing is required during the supply of the inert gas Gc, and it is sufficient that if the inert gas Gr flows into the gas staying chamber C.

Figure 2:
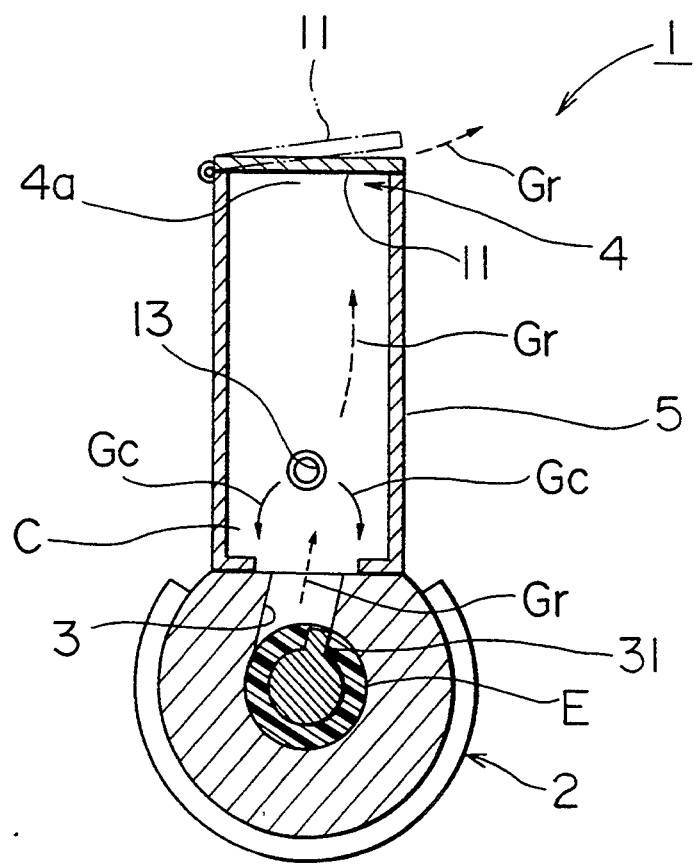
FIG. 2 is a cross-sectional view taken along the line A—A in FIG. 1.

On the other hand, the gas component Gr generated from the melted resin E ascends through the vent hole 3 and the gas staying chamber C by natural convection due to its high temperature as shown by the dotted line arrows in FIG. 2, and it is released into the atmospheric air through the gas exhaust port 4 at the upper end of the vent hole cover 5. In addition, the internal pressure of the gas staying chamber C is detected by the pressure sensor 15, and is applied to the control section 16. The control section 16 supplies the inert gas Gc only when the internal pressure is not more than a certain value, namely, when the generation amount of the gas component Gr is not more than a certain amount, while it stops the supply of the inert gas Gc when the internal pressure exceeds the certain value, namely, when the generation amount of the gas component Gr is large. In this case, the internal pressure can be optionally generated using a weight of the lid 11 or the like.

Incidentally, the pressure sensor 15 and the control section 16 may not necessarily be provided. Therefore, the inert gas Gc may be always supplied.

Figure 3:
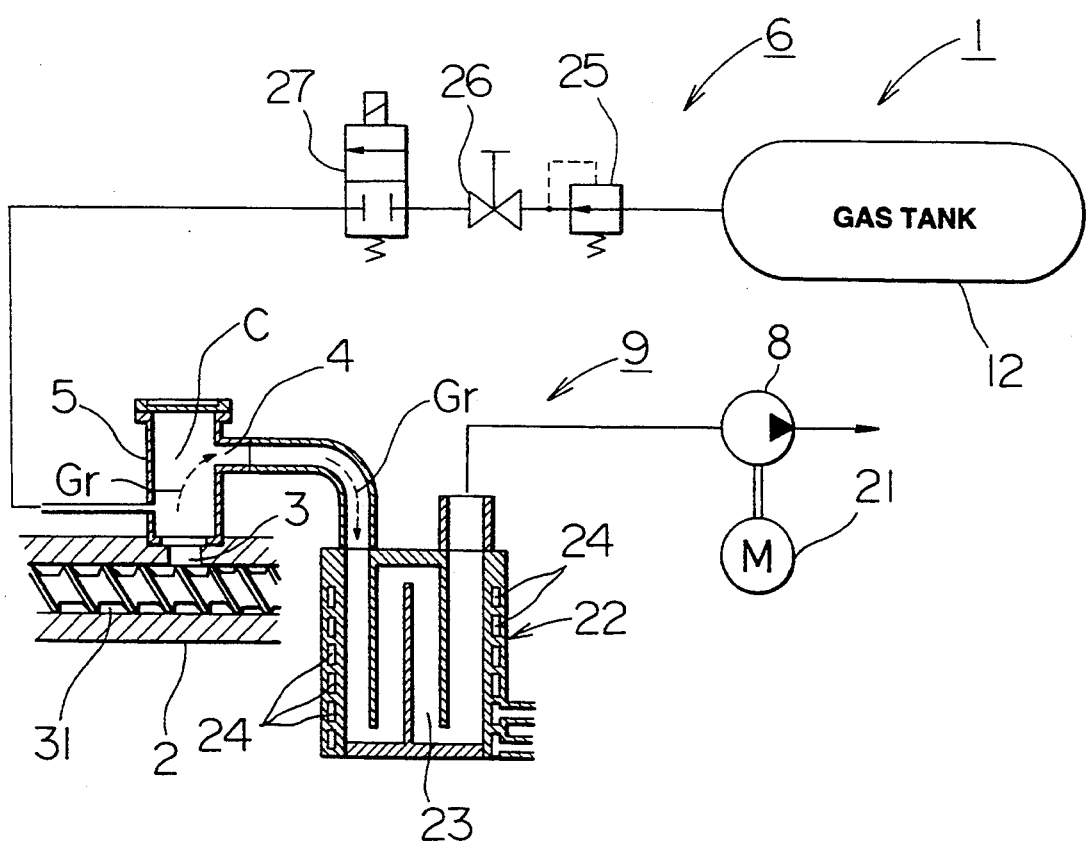
FIG. 3 is a block diagram for important parts of a vent-type injection molding machine according to an altered embodiment of this invention.

Next, an altered embodiment of the injection molding machine 1 according to this invention will be explained with reference to FIG. 3.

In an injection molding machine 1 according to the altered embodiment, the upper end opening of the vent hole cover 5 is plugged, a gas exhaust port 4 is provided at an upper portion of the side face of the same cover 5, and a forced suction unit 9 is connected to the gas exhaust port 4. The forced suction unit 9 is provided with a vacuum pump 8 which is operated by a driving motor 21, and the vacuum pump 8 is connected to the gas exhaust port 4 through a recovery tank 22. The recovery tank 22 has a zigzag cooling passage 23 in its interior, which has a water jacket 24 for cooling the gas component Gr passing through the cooling passage 23, and have a cooling water to flow in the water jacket 24. Thus, by operating the vacuum pump 8, the gas component Gr generated from the vent hole 3 is sucked through the gas exhaust port 4 by force, a part of which is recovered by the recovery tank 22, and the remainder is sucked to the vacuum pump 8 side.

In addition, the gas tank 12 is connected to the lower portion of the vent hole cover 5 in the same manner as the above-mentioned embodiment through a pressure reducing valve 25 for performing pressure reduction, a throttle valve 26 for controlling the supply amount of the inert gas Gr, and an opening-closing switching valve 27.

Thus, in the case of the altered embodiment, for example, on the weighing step (during revolution of the screw) in which the generation amount of the gas component Gr becomes large, forced exhaust can perform by relatively high negative pressure, while in the steps except the weighing step (during no revolution of the screw) in which the generation amount of the gas component Gr is small, forced exhaust can perform by stopping or a relatively low negative pressure. In this case, the inert gas Gc may be always supplied, or it may be supplied only during the steps except the weighing step (during no revolution of the screw).

As described above, the embodiments have been explained in detail, however, this invention is not limited to such embodiments, which can be optionally changed within a range without deviating from the gist of this invention with respect to detailed constitution, technique and the like.

We claim:

1. A vented injection molding machine comprising:
   a heating cylinder provided with a vent hole for exhausting a gas component generated from a melted resin;
   a vent hole cover, covering said vent hole, having a gas exhaust port at an upper portion including a lid which functions as a valve for opening or closing said gas exhaust port wherein a gas staying chamber is formed at an interior of said vent hole cover; and
   an inert gas supply unit for supplying an inert gas to the interior of said vent hole cover.

2. A vented injection molding machine comprising:
   a heating cylinder provided with a vent hole for exhausting a gas component generated from a melted resin;
   a vent hole cover, covering said vent hole, having a gas exhaust port at an upper portion thereof, wherein a gas staying chamber is formed at an interior of said vent hole cover; and
   an inert gas supply unit, for supplying an inert gas to the interior of said vent hole cover, including a supply control section which supplies inert gas when an amount of gas component generated from a melted resin is less than a predetermined amount.

3. The vented injection molding machine according to claim 1, wherein said inert gas is heavier than air.

4. The vented injection molding machine according to claim 2, wherein the gas exhaust port is connected to a forced suction unit which performs forced exhaust by the suction of a vacuum pump.

5. The vented injection molding machine according to claim 4, wherein the forced suction unit is provided with a recovery tank having a cooling passage for recovering the gas component sucked through the gas exhaust port.

6. The vented injection molding machine according to claim 1, wherein the inert gas supply unit is provided with a supply control section which supplies inert gas when an amount of the gas component generated from a melted resin is less than a predetermined amount.

* * * * *